US011307778B2

(12) United States Patent
Klein

(10) Patent No.: US 11,307,778 B2
(45) Date of Patent: Apr. 19, 2022

(54) POWER MANAGEMENT FOR SOLID STATE DRIVES IN A NETWORK

(71) Applicant: Kioxia Corporation, Tokyo (JP)

(72) Inventor: Yaron Klein, Raanana (IL)

(73) Assignee: Kioxia Corporation, Tokyo (JP)

( * ) Notice: Subject to any disclaimer, the term of this patent is extended or adjusted under 35 U.S.C. 154(b) by 354 days.

(21) Appl. No.: 15/916,642

(22) Filed: Mar. 9, 2018

(65) Prior Publication Data

US 2019/0278495 A1    Sep. 12, 2019

(51) Int. Cl.
*G06F 3/06* (2006.01)
*G06F 1/3225* (2019.01)
*G06F 1/3234* (2019.01)

(52) U.S. Cl.
CPC .......... *G06F 3/0625* (2013.01); *G06F 1/3225* (2013.01); *G06F 1/3268* (2013.01); *G06F 3/0634* (2013.01); *G06F 3/0688* (2013.01)

(58) Field of Classification Search
CPC .... G06F 3/0625; G06F 1/3225; G06F 1/3268; G06F 3/0634; G06F 3/0688
See application file for complete search history.

(56) References Cited

U.S. PATENT DOCUMENTS

| | | |
|---|---|---|
| 9,268,383 B2 | 2/2016 | Hua et al. |
| 9,720,598 B2 | 8/2017 | Malwankar |
| 9,747,039 B1 | 8/2017 | Coleman et al. |
| 2006/0053324 A1* | 3/2006 | Giat ........................ H04L 12/10 713/300 |
| 2007/0016726 A1* | 1/2007 | Zohar ................. G06F 11/3433 711/114 |

(Continued)

FOREIGN PATENT DOCUMENTS

| | | |
|---|---|---|
| CN | 101442548 A | 5/2009 |
| WO | 2012-137372 A1 | 10/2012 |

(Continued)

OTHER PUBLICATIONS

Zvika Guz et al., "NVMe-over-Fabrics Performance Characterization and the Path to Low-Overhead Flash Disaggregation," Samsung Semiconductor, Inc., May 2017, pp. 1-9.

(Continued)

*Primary Examiner* — Phil K Nguyen
*Assistant Examiner* — Gayathri Sampath
(74) *Attorney, Agent, or Firm* — Allen & Overy LLP

(57) ABSTRACT

In one embodiment, a network of SSDs includes a switch with a plurality of powered ports configured to be communicatively coupled to a controller and a host client and a plurality of SSDs configured to be communicatively coupled to the plurality of powered ports. The switch is configured to deliver up to a predefined power level to each of the plurality of SSDs via the plurality of powered port. Each of the plurality of SSDs consumes power. The controller is configured to manage the predefined power level for each of the plurality of SSDs by identifying the power consumed by each of the plurality of SSDs and allocating a new power level to each of the plurality of SSDs based on the power consumed by each of the plurality of SSD. In one embodiment, the switch and the plurality of SSDs are configured to occupy a server rack space.

12 Claims, 4 Drawing Sheets

(56) References Cited

U.S. PATENT DOCUMENTS

| | | | |
|---|---|---|---|
| 2008/0184042 A1* | 7/2008 | Parks | G06F 1/3203 713/300 |
| 2010/0153750 A1* | 6/2010 | Shah | H04L 12/10 713/300 |
| 2010/0332871 A1* | 12/2010 | Allalouf | G06F 9/5027 713/320 |
| 2014/0215254 A1* | 7/2014 | Mandava | G06F 1/266 713/340 |
| 2015/0046646 A1* | 2/2015 | Elzind | G06F 3/0658 711/114 |
| 2015/0185813 A1* | 7/2015 | Ping | G06F 3/067 713/323 |
| 2015/0261281 A1 | 9/2015 | Bickelman et al. | |
| 2015/0331473 A1* | 11/2015 | Jreji | G06F 1/3206 713/320 |
| 2015/0378605 A1* | 12/2015 | Huang | G06F 3/0688 711/103 |
| 2016/0041786 A1* | 2/2016 | Erez | G06F 3/0658 711/103 |
| 2016/0085290 A1 | 3/2016 | Skandakumaran et al. | |
| 2016/0116968 A1* | 4/2016 | Thangaraj | G06F 1/3268 713/320 |
| 2016/0210060 A1 | 7/2016 | Dreyer | |
| 2016/0259597 A1 | 9/2016 | Worley et al. | |
| 2016/0328347 A1 | 11/2016 | Worley et al. | |
| 2017/0060208 A1 | 3/2017 | Sawai et al. | |
| 2017/0075611 A1* | 3/2017 | Choi | G06F 3/0625 |
| 2017/0185554 A1 | 6/2017 | Fricker | |
| 2017/0286363 A1 | 10/2017 | Joshua et al. | |
| 2018/0024964 A1 | 1/2018 | Mao et al. | |
| 2018/0335958 A1* | 11/2018 | Wu | G06F 3/0631 |
| 2019/0101974 A1* | 4/2019 | Guim Bernat | G06F 3/067 |
| 2019/0235774 A1* | 8/2019 | Benisty | G06F 3/0625 |

FOREIGN PATENT DOCUMENTS

| | | |
|---|---|---|
| WO | 2017-131751 A1 | 8/2017 |
| WO | 2017-188981 A1 | 11/2017 |

OTHER PUBLICATIONS

"NVM Express Moves Into the Future," NVM Express, Inc., Jul. 14, 2017, pp. 1-7.

Patrice Couvert, "High Speed I/O processor for NVMe over Fabric (NVMeoF)," Datacenter Product Marketing, KALRAY, 2016, pp. 1-18.

International Search Report dated Jul. 11, 2019 in corresponding application No. PCT/IB2019/00258.

PCIe v5 Base specification PCI Express® Base Specification Revision 5.0 Version 1.0, pp. 1-1299, May 22, 2019.

\* cited by examiner

POWER MANAGEMENT FOR SOLID STATE DRIVES IN A NETWORK

FIELD OF THE INVENTION

This invention generally relates to an implementation of solid state drive (SSDs) in a network that enables efficient management of power.

BACKGROUND OF THE INVENTION

A typical SSD includes non-volatile NAND media (comprised of memory blocks capable of retaining data when disconnected from power), a controller and a host interface (e.g., PCIe, SAS, SATA, or any other interface compatible with hard disk drives (HDD)) to receive commands from a host client computer. The SSD controller translates logical addresses used in commands transferred across a host interface (e.g., logical read and write commands from a host client computer sent across the host interface to the SSD) to low-level flash operations (e.g., read, program, and erase) for the associated physical block and page addresses of the SSD. The SSD controller also performs numerous other functions, including, for example: error code correction; garbage collection; scheduling; managing over-provisioning; and wear-leveling. Because the SSD controller can accommodate the logical addressing used in host interfaces, SSDs easily integrate with HDD compatible interfaces and offload overhead that would otherwise be needed for the host client computer to perform such functions.

Traditional SSDs use a form factor that is compatible with standard HDDs. SSDs are also offered in a variety of different form factors, including, for example, the PCIe interface (a high-speed serial replacement of the older PCI and PCI-X parallel bus architecture), M.2 (previously known as the Next Generation Form Factor or NGFF, which provides a more versatile connection interface and supports different module lengths and widths, compared to the mini-SATA standard that M.2 replaced), HHHL (half height half length), and U.2 (mechanically similar to SATA Express interface that provides four PCIe lanes, where each lane includes two differential signaling pairs). For example, the M.2 form factor provides small disk sizes starting from 12 mm wide by 16 mm long and may use a PCIe interface. NVMe (Non-Volatile Memory Express) provides a standard for accessing non-volatile storage media via a PCIe bus. NVMeoF (NVMe over Fabric) extends access to non-volatile storage media connected to remote devices using fast media, including, for example RDMA (remote direct memory access allowing one computer to directly access the memory of another computer without requiring involvement of the operating systems), FC (Fibre Channel, a high-speed network technology that typically operates at rates of 1-128 gigabits/sec that is primarily used for communication between servers and storage systems), and IB (InfiniBand allowing a high throughput and low latency connection between servers and storage systems).

Although the development of fast media has enabled the use of SSDs in NVMeoF implementations, the existing disk packaging for SSDs occupy significant server rack space. Existing SSDs utilize traditional JBOD (just a bunch of disks) and JBOF (just a bunch of flash) packaging in legacy-style server rack mount enclosures. For example, traditional 2U server rack mount enclosures require 3.5 inches of server rack height. With the development of smaller form factor SSDs, more SSDs can be incorporated within a given server rack mount enclosure, however, the enclosures themselves occupy significant real estate that could otherwise be used by other devices.

Additionally, a traditional host HDD interface is not capable of taking full advantage of the performance of a SSD. For example, the host client using an HDD interface is not capable of issuing low-level commands that govern how data is programmed and erased in the SSD and the SSD is not aware of when the host client will issue read or write commands. Accordingly, both the SSD controller and the host client employ best effort approaches for performing their independent functions, which results in inefficient utilization of SSD resources, including, for example, imbalanced distribution of load and power consumption among SSD devices, inefficient use of volatile memory capacity, unpredictable data storage, and increased wear-leveling of SSD memory.

Accordingly, there is an unmet demand for a SSD implementation that occupies less server rack space and enables efficient management of SSD power consumption.

BRIEF DESCRIPTION OF THE INVENTION

In one embodiment, a network of SSDs includes a switch with a plurality of powered ports configured to be communicatively coupled to a controller and a host client and a plurality of SSDs configured to be communicatively coupled to the plurality of powered ports. The switch is configured to deliver up to a predefined power level to each of the plurality of SSDs via the plurality of powered port. Each of the plurality of SSDs consumes power. The controller is configured to manage the predefined power level for each of the plurality of SSDs by identifying the power consumed by each of the plurality of SSDs and allocating a new power level to each of the plurality of SSDs based on the power consumed by each of the plurality of SSD.

In one embodiment, the plurality of SSDs are directly coupled to the plurality of powered ports. In another embodiment, the plurality of SSDs are communicatively coupled to the plurality of powered ports via an adapter. In one embodiment, the plurality of ports are comprised of Ethernet ports.

In one embodiment, the power consumed by each of the plurality of SSDs is identified by calculating the power consumed by each of the plurality of SSDs during one or more predetermined time periods in real-time. In another embodiment, the power consumed by each of the plurality of SSDs is identified by estimating the power consumed by each of the plurality of SSDs during one or more predetermined time periods according to a number of commands pending in one or more memory buffers of each of the plurality of SSDs. In one embodiment, a root-mean-square power consumption is calculated for each of the plurality of SSDs based on the power consumed during one or more predetermined time periods in real-time.

In one embodiment, the network of SSDs includes a server rack space and the switch and the plurality of SSDs are configured to occupy the server rack space.

In one embodiment, a network of SSDs includes a switch comprised of a plurality of powered ports, a plurality of SSDs configured to be communicatively coupled to the plurality of powered ports, and a server rack space. The switch and the plurality of SSDs are configured to occupy the server rack space. In one embodiment, the network of SSDs includes a controller configured to be communicatively coupled to the switch, wherein the controller is configured to manage a maximum power level allocated to each of the plurality of SSDs by identifying a power consumed by each of the plurality of SSDs and adjusting the maximum power level to the plurality of SSDs based on the power consumed by each of the plurality of SSDs.

In one embodiment, a method of implementing a plurality of SSDs over a network includes identifying a total system power, allocating a power level to each of a plurality of SSDs communicatively coupled to a plurality of powered ports of a switch, identifying a power consumed by each of the plurality of SSD, detecting an imbalance in the power consumed by each of the plurality of SSDs, and allocating a different power level to each of the plurality of SSDs based on the power consumed by each of the plurality of SSDs. The total of the allocated power levels does not exceed the total system power. The total of the allocated different power level to each of the plurality of SSDs does not exceed the total system power.

In one embodiment, the power consumed by each of the plurality of SSDs is identified by calculating the power consumed by each of the plurality of SSDs during one or more predetermined time periods in real-time. In another embodiment, the power consumed by each of the plurality of SSDs is identified by estimating the power consumed by each of the plurality of SSDs during one or more predetermined time periods according to a number of commands pending in one or more memory buffers of each of the plurality of SSDs. In one embodiment a root-mean-square power consumption is calculated for each of the plurality of SSDs.

In one embodiment, a method of implementing a plurality of SSDs over a network includes receiving a command from a host client, detecting a number of commands pending in each of a plurality of SSDs, detecting an imbalance in the number of commands pending in each of the plurality of SSDs, identifying a power consumed by each of the plurality of SSDs, and issuing the command to one of the plurality of SSDs.

In one embodiment, the command is issued to the SSD with the lowest power consumption. In another embodiment, the command is issued to the SSD with the lowest number of pending commands. In another embodiment, the command is issued to the SSD with the lowest number of pending write commands.

In one embodiment, a method of implementing a plurality of SSDs over a network includes, identifying a total system power, allocating a power level to each of a plurality of SSDs communicatively coupled to a plurality of powered ports of a switch, and managing the power consumed by each of the plurality SSDs by limiting performance of write commands by each of the plurality of SSDs based on the allocated power level to each of the plurality of SSDs. The total of the allocated power does not exceed the total system power.

In one embodiment, a method of implementing a plurality of SSDs over a network includes, identifying a total system power, allocating a power level to each of a plurality of SSDs communicatively coupled to a plurality of powered ports of a switch, and managing the power consumed by each of the plurality SSDs by adjusting a frequency of issuing write commands to each of the plurality of SSDs based on the allocated power level to each of the plurality of SSDs. The total of the allocated power does not exceed the total system power.

DETAILED DESCRIPTION OF THE INVENTION

Figure 1:
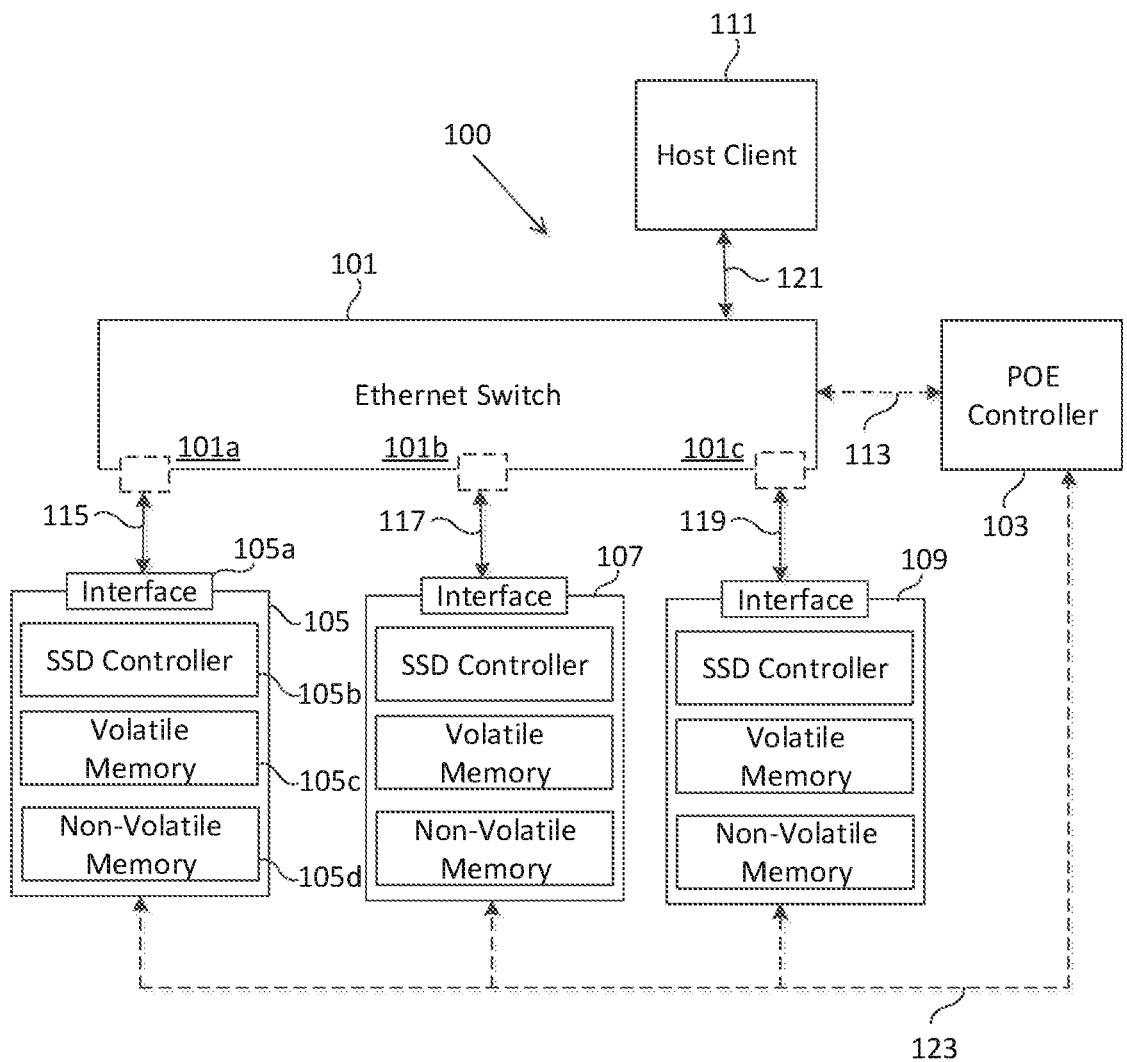
FIG. 1 is a block diagram of one embodiment of SSDs in a network.

FIG. 1 is a block diagram illustrating one embodiment of SSDs in a network 100. An Ethernet switch 101 communicates with a POE controller 103 over connection 113, a plurality of SSDs 105, 107, and 109 over connections 115, 117, and 119 respectively, and a host client 111 over connection 121. The host client 111 may communicate with the Ethernet switch 101 using a standard Ethernet port, or any known method in the art, including, but not limited to, a PCIE port, and/or a UART port (among others). In one embodiment, any number of host clients 111 may communicate with Ethernet switch 101. The Ethernet switch 101 includes a plurality of Ethernet ports, 101a, 101b, and 101c that can be used to connect one or more Ethernet devices. In one embodiment, Ethernet switch 101 is capable of providing power to a device connected to each of the available Ethernet ports 101a, 101b, and 101c (i.e., "power over Ethernet" or "POE"). In one embodiment, one or more of the available Ethernet ports 101a, 101b, and 101c may be powered. Although the Ethernet switch 101 is illustrated in FIG. 1 as having three ports, Ethernet switch 101 may include any number of ports. For example, an Ethernet switch 101 capable of providing POE may include 48 POE ports, with a power of 380 watts or approximately 8 watts per port in a 1 U form factor that occupies 1.75 inches of server rack height. An external power supply may be used to increase the power of the Ethernet switch 101 to 1,440 watts or approximately 30 watts per port.

Host client 111 sends commands to SSDs 105, 107, and 109 via Ethernet switch 101. POE controller 103 monitors and manages traffic over Ethernet switch 101 over connection 113 using any method known in the art, including, for example, switch counters and drive statistics. For example, in one embodiment, the host client 111 issues commands directly to SSDs 105, 107, and/or 109 via Ethernet switch 101. In this embodiment, the POE controller 103 monitors traffic over Ethernet switch 101. In another embodiment, POE controller 103 routes commands from the host client 111 to SSDs 105, 107, and/or 109 via Ethernet switch 101. In this embodiment, the host client 111 may send a write command to the POE controller 103 and the POE controller 103 may identify the SSD 105, 107, and/or 109 that will execute the write command.

In one embodiment, SSD controller 105b of SSD 105 temporarily buffers commands received from Ethernet switch 101 in volatile memory 105c, including, for example, read, write, and erase commands. If the command is a write command, SSD controller 105b stores the command in a command queue and buffers the associated data in volatile memory 105c until the write command can be executed by SSD controller 105c and the data can be written to non-volatile memory 105d. If the command is a read command, SSD controller 105b stores the read command in a command queue in volatile memory 105c until the read command can be executed by SSD controller 105c and the data can be read from non-volatile memory 105d. Non-volatile memory 105d can be, but is not limited to, an EEPROM, NAND, NOR, MRAM, PCM, PCME, PRAM, PCRAM, PMC, RRAM, NRAM, Ovonic Unified Memory, Chalcogenide Ram, C-RAM, and/or any other type of non-volatile memory known in the art, and volatile memory 105c can be, but is not limited to, DRAM, SRAM, T-RAM, Z-RAM, and/or any other type of volatile memory known in the art.

The SSDs 105, 107, and 109 communicate with Ethernet switch 101 via ports 101a, 101b, and 101c. SSD 105 includes an interface 105a that allows SSD 105 to communicate with Ethernet port 101a over a connection 115. In one embodiment, interface 105a is an Ethernet interface. Port 101a of Ethernet switch 101 provides power to SSD 105 via interface 105a. Ethernet switch 101 additionally sends commands to SSD 105 via interface 105a, including, for example, write and read commands (among others). SSD 105 also includes a SSD controller 105b, a volatile memory 105c, and a non-volatile memory 105d.

In one embodiment, interface 105a includes a PCIe interface. In another embodiment, interface 105a includes any interface known in the art, including, for example, PCIe, PCI, PCI-x, SATA, AGP, or SAS (among others). An adapter may be used (not shown in FIG. 1) to enable interface 105a to communicate with Ethernet port 101a over connection 115. The adapter may include a passive device that simply routes power and data from the connections of Ethernet port 101a to the appropriate connections of interface 105a. However, it may not be possible to use a passive adapter if the number of connections of Ethernet port 101a are not equivalent to the number of connections of interface 105. Accordingly, the adapter may be an active device that includes a controller that receives power and data from the connections of Ethernet port 101a and transfers the received power and data to the appropriate connections of interface 105a.

In one embodiment, interface 105a may be a male RJ-45 Ethernet connector that allows SSD 105 to be directly connected to Ethernet switch 101. Accordingly, small form factor SSDs 105, 107, and 109 can be connected directly to each port 101a, 101b, and 101c of Ethernet Switch 101 in the same server rack space occupied by Ethernet Switch 101. This configuration eliminates the need to occupy a separate server rack space for a JBOD or JBOF appliance that includes a number of SSDs and enables additional server rack space to be used for additional Ethernet switches and connected SSDs.

In another embodiment, interface 105a is a female RJ-45 Ethernet connector that allows SSD 105 to be connected to Ethernet switch 101 using an Ethernet cable. If Interface 105a is an Ethernet connector, the connector pinout arrangement may be any known Ethernet pinout arrangement in the art, including, for example, SNIA IP, Kinetics, LitePanels, or AFX (among others). In one embodiment, any type of Ethernet cable may be used to connect Ethernet Switch 101 to SSD 105, including, for example, CAT 5, CAT5e, CAT6, or CAT6a. In another embodiment, Ethernet switch 101 may be a male or female Ethernet connector.

IEEE802.3af, IEEE802.3at and PoH standards ensure that POE supplies a minimum capacity of power to each port of Ethernet switch 101. For example, the IEEE 802.3af standard specifies a minimum of 12.95 watts of power using CAT5e cable over 2 pairs of wires, the IEEE802.3at standard specifies 25.5 watts of power using CAT5e cable over 2 pairs of wires, and the PoH standard specifies 95 watts of power using Cat5e or Cat6 cable over 4 pairs of wires. However, the total power of Ethernet switch 101 may not be sufficient to supply maximum power to each port 101a, 101b, and 101c simultaneously. For example, if Ethernet switch 101 has 48 ports and a total capacity of 240 watts, Ethernet switch 101 can supply 5 watts of power simultaneously to each port.

In one embodiment, a POE controller 103 communicates with Ethernet switch 101 over connection 113 to efficiently manage the power supplied by Ethernet switch 101 to ports 101a, 101b, and 101c. In this embodiment, POE controller 103 may manage the SSDs 105, 107, and 109 over the Ethernet switch 101 using, for example, a protocol such as the Link Layer Discovery Protocol (LLDP) that allows the POE controller 103 to dynamically allocate power to LLDP-enabled SSDs 103, 105, and 107 based on the amount of power needed by such SSDs. In another embodiment, any known protocol may be used. In another embodiment, POE controller 103 communicates with SSDs 105, 107, and 109 over connection 123 to efficiently manage the power supplied by Ethernet switch 101 to ports 101a, 101b, and 101c. In this embodiment, POE controller 103 may manage the SSDs 105, 107, and 109 using, for example, $I^2C$ connectivity and a protocol such as the NVMe-MI protocol to dynamically manage the power consumed by SSDs 103, 105, and 107. In another embodiment, any known connectivity standard and any known protocol may be used. In another embodiment, POE controller 103 may be incorporated within Ethernet Switch 101 (not shown in FIG. 1) and may communicate directly with SSDs 105, 107, and 109 over connections 115, 117, and 119.

An SSD typically consumes approximately 5 to 10 times more energy to write a full page of data than to read a full page of data, and approximately 20 to 40 times more energy to erase a full page of data than to read a full page of data. Accordingly, the power requirements of each SSD 105, 107, and 109 will vary significantly based upon the number of read, write, and/or erase commands that are being executed by such SSDs and the number of such commands that are pending within the command queues of such SSDs.

In one embodiment, POE controller 103 efficiently manages the power consumption of SSDs 105, 107, and 109 by reallocating the capacity of power available to each port 101a, 101b, and 101c of Ethernet port 101 based upon the amount of power needed by the connected SSDs 105, 107, and 109. If one or more SSDs 105, 107, and/or 109 are inactive or have no pending commands that need to be executed, the associated one or more ports 101a, 101b, and/or 101c may be placed into a hibernate mode to reduce power consumption to the minimum stead-state power required by such SSDs.

In another embodiment (discussed in further detail with respect to FIG. 3), POE controller 103 efficiently manages the power consumption of SSDs 105, 107, and 109 by initially allocating a power for each of ports 101a, 101b, and 101c equal to the average power that can be supplied by Ethernet switch 101 to such ports. For example, if Ethernet switch 101 can supply a total power of 18 watts (W), the POE controller 103 instructs Ethernet switch 101 to initially allocate a power of 6 W for each of ports 101a, 101b, and 101c. The POE controller 103 monitors power consumption by each SSD 105, 107, and 109 over ports 101a, 101b, and 101c. If the POE controller 103 detects an imbalance in the amount of power consumed by SSDs 105, 107, and/or 109 over ports 101a, 101b, and 101c, the POE controller 103 will instruct the Ethernet switch 101 to reduce the allocated power to the one or more ports associated with SSDs consuming less than the initially allocated power. For example, if SSD 105 connected to port 101a is consuming 3 W of the allocated 6 W capacity, POE controller 103 may instruct Ethernet switch 101 to reduce the allocated power to port 101a to the real-time POE power consumption of 3 W. In another embodiment, the POE controller 103 may instruct Ethernet switch 101 to reduce the allocated power to port 101a to a percentage of the power consumption (e.g., 120% of the power consumption or 3.6 W). By reducing the allocated power to ports consuming less than the initially allocated power, POE controller 103 can then instruct Ethernet switch 101 to increase the allocated power to the one or more SSDs associated with Ethernet ports that require more than the initially allocated power. In another embodiment, different power levels may initially be allocated to each of ports 101a, 101b, and 101c.

In one embodiment, POE controller 103 manages power consumption of each of SSD 105, 107, and 109 via out of band throttling of commands. In this embodiment, POE controller 103 limits the performance of write commands by SSDs 105, 107, and 109 based on the set power budget of each of ports 101a, 101b, and 101c and corresponding SSDs 105, 107, and 109.

In another embodiment, POE controller 103 manages power consumption of each SSD via in band scheduling of write commands (i.e., when commands from the host client 111 are sent to POE controller 103 and routed by the POE controller 103 to SSDs 105, 107, and 109). In this embodiment, the POE controller 103 adjusts the frequency of issuing commands to SSDs 105, 107, and 109 based on the set power budget of each of ports 101a, 101b, and 101c and corresponding SSDs 105, 107, and 109.

Figure 2:
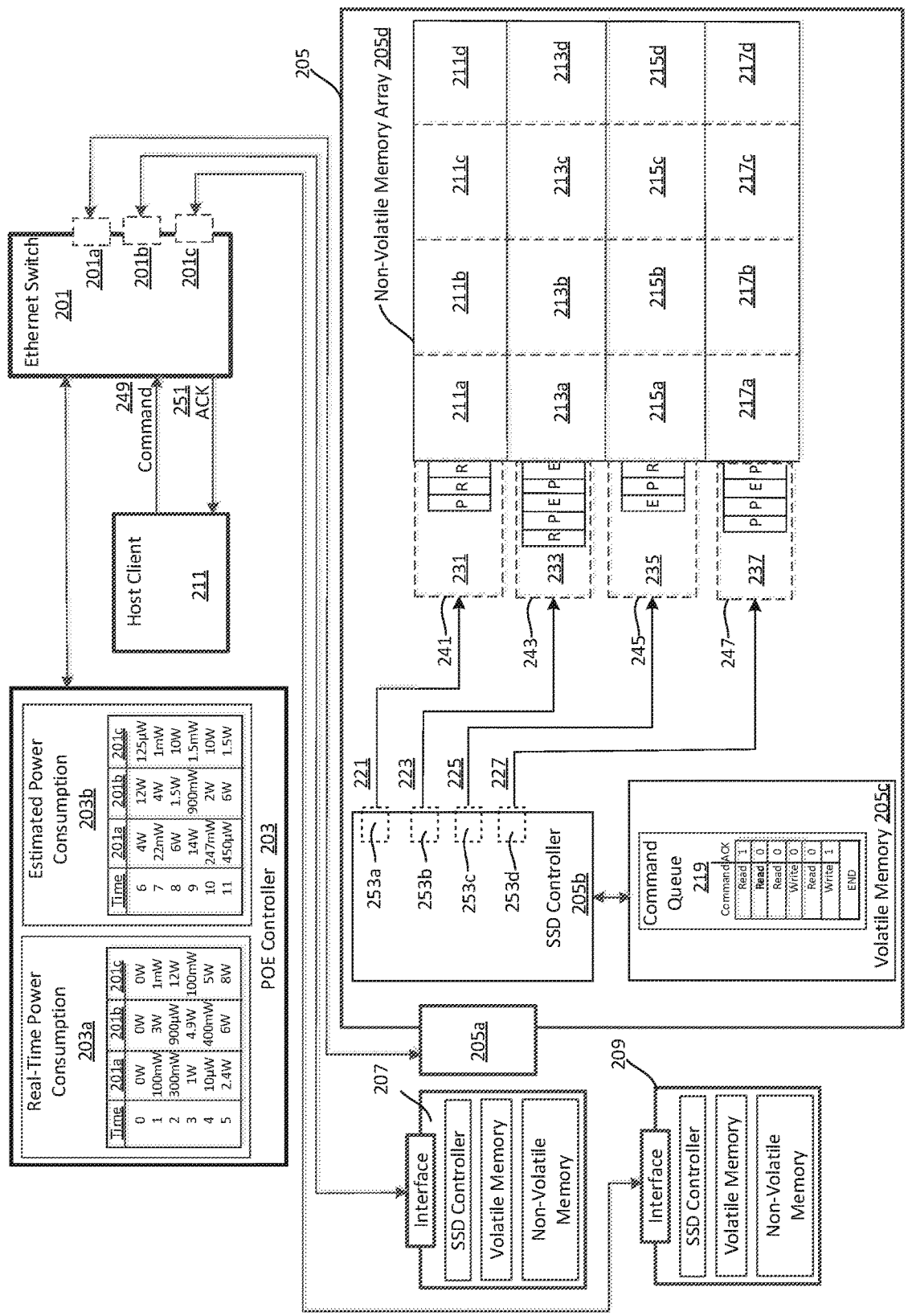
FIG. 2 is a block diagram of one embodiment of SSDs in a network.

FIG. 2 is a block diagram illustrating one embodiment of SSDs in a network 200. An Ethernet switch 201 communicates with a POE controller 203, a plurality of SSDs 205, 207, and 209, and a host client 211 (also known as a client interface). The host client 211 may communicate with the Ethernet switch 201 using a standard Ethernet port, or any known method in the art, including, but not limited to, a PCIE port, and/or a UART port (among others). In one embodiment, any number of host clients 211 may communicate with Ethernet switch 201. The Ethernet switch 201 includes a plurality of Ethernet ports, 201a, 201b, and 201c that can be used to connect one or more Ethernet devices. In one embodiment, Ethernet switch 201 is capable of providing POE to a device connected to each of the available Ethernet ports 201a, 201b, and 201c. In one embodiment, one or more of the available Ethernet ports 201a, 201b, and 201c may be powered. Although the Ethernet switch 201 is illustrated in FIG. 2 as having three ports, Ethernet switch 201 may have any number of ports.

Host client 211 sends commands to SSDs 205, 207, and 209 via Ethernet switch 201. POE controller 203 monitors and manages traffic over Ethernet switch 201 using any method known in the art, including, for example, switch counters and drive statistics. For example, in one embodiment, POE controller 203 routes commands from the host client 211 to SSDs 205, 207, and/or 209 via Ethernet switch 201. In this embodiment, the host client 211 may send a command to the POE controller 203 and the POE controller 203 may identify the SSD 205, 207, and/or 209 that will execute the command. In another embodiment, the host client 211 issues commands directly to SSDs 205, 207, and/or 209 via Ethernet switch 201. In this embodiment, the POE controller 203 monitors traffic over Ethernet switch 201.

The SSDs 205, 207, and 209 communicate with Ethernet switch 201 via ports 201a, 201b, and 201c. SSD 205 includes an interface 205a that allows SSD 205 to communicate with Ethernet port 201a. In one embodiment, interface 205a is an Ethernet interface. Port 201a of Ethernet switch 201 provides power to SSD 205 via interface 205a. Ethernet switch 201 additionally sends commands to SSD 205 via interface 205a, including, for example, write and read commands. In one embodiment, interface 205a is a PCIe interface. In another embodiment, interface 205a is any interface known in the art, including, for example, PCIe, PCI, PCI-x, SATA, AGP, or SAS (among others). In one embodiment, an adapter may be used (not shown in FIG. 2) to enable interface 205a to communicate with Ethernet port 201a. In one embodiment, interface 205a is an RJ-45 Ethernet connector that allows SSD 205 to be directly connected to Ethernet switch 201. Accordingly, small form factor SSDs 205, 207, and 209 can be connected directly to each of port 201a, 201b, and 201c of Ethernet Switch 201 in the same server rack space occupied by Ethernet Switch 201.

SSD controller 205b of SSD 205 temporarily buffers commands received from Ethernet switch 201 in a command queue 219 in volatile memory 205c, including, for example, read, write and erase commands. If the command is a write command, SSD controller 205b stores the command in a command queue and buffers the associated data in volatile memory 205c until the write command can be executed by SSD controller 205c and the data can be written to non-volatile memory 205d. If the command is a read command, SSD controller 205b stores the read command in a command queue 219 in volatile memory 205c until the read command can be executed by SSD controller 205c and the data can be read from non-volatile memory 205d. Non-volatile memory 205d can be, but is not limited to, an EEPROM, NAND, NOR, MRAM, PCM, PCME, PRAM, PCRAM, PMC, RRAM, NRAM, Ovonic Unified Memory, Chalcogenide Ram, C-RAM, and/or any other type of non-volatile memory known in the art, and volatile memory 205c can be, but is not limited to, DRAM, SRAM, T-RAM, Z-RAM, and/or any other type of volatile memory known in the art SSD controller 205b reads data from and writes data to non-volatile memory 205d using one or more of memory data channels 221, 223, 225, and/or 227. In one embodiment, non-volatile memory 205d may have any number of channels (i.e., one or more). Each channel is controlled independently by a channel controller 253a, 253b, 253c, and 253d within the SSD controller 201 and each channel controller communicates with a corresponding subset of non-volatile memory devices 211a-d, 213a-d, 215a-d, and 217a-d. Within each channel controller 253a-d, there is a channel command queue 231, 233, 235, and 237 that is stored in a respective non-volatile memory buffer 241, 243, 245, and 247. Within each channel command queue 231, 233, 235, and 237, there may be a different mixture of commands directed to the corresponding non-volatile memory devices, including read (represented by "R"), write/program (represented by "P") and erase (represented by "E").

In one embodiment, POE controller 203 efficiently manages the power consumption of SSDs 205, 207, and 209 by initially allocating a power for each of ports 201a, 201b, and 201c equal to the average power that can be supplied by Ethernet switch 201 to such ports. The POE controller 203 monitors power consumption by each SSD 205, 207, and 209 over ports 201a, 201b, and 201c. If the POE controller 203 detects an imbalance in the amount of power consumed by SSDs 205, 207, and/or 209 over ports 201a, 201b, and 201c, the POE controller 203 will instruct the Ethernet switch 201 to reduce the allocated power to the one or more ports associated with SSDs consuming less than the initially allocated power. By reducing the allocated power to ports consuming less than the initially allocated power, POE controller 203 can then instruct Ethernet switch 201 to increase the allocated power to the one or more SSDs associated with Ethernet ports that require more than the initially allocated power. In another embodiment, different power levels may initially be allocated to each of ports 201a, 201b, and 201c.

In one embodiment, POE controller 203 determines the real-time power consumption of each of SSDs 205, 207, and 209 by monitoring the real-time power delivered via Ethernet switch 201 over ports 201a, 201b, and 201c over a predetermined period of time. For example, if the predetermined period of time is 500 ms and SSD 205 performs a write operation consuming 20 µJ over 90 µs and a read operation consuming 1 µJ over 10 µs, the power consumption during the predetermined period of time is approximately 322 mW. Depending on the type and duration of the operations performed by the SSD during the predetermined period of time (e.g., read, write, and/or erase operations), the power consumption of the SSD may vary significantly. In one embodiment, the POE controller 203 may maintain a real-time power consumption table 203a identifying the real-time power consumption for each of SSDs 205, 207, and 209 via ports 201a, 201b, and 201c, respectively. The POE controller 203 may continuously monitor the real-time power consumption of each of SSDs 205, 207, and 209 over numerous cycles of the predetermined period of time and store the calculated power consumption of each SSD during each cycle in table 203a (e.g., time "1" corresponds to the first 500 ms cycle, time "2" corresponds to the second 500 ms cycle, etc.). For example, if the POE controller 203 monitors SSD 205 for five 500 ms cycles (i.e., 2.5 seconds), the POE controller 203 may calculate the power consumption of SSD 205 during each of the five 500 ms cycles (e.g., 100 mW during time "1", 300 mW during time "2", 1 W during time "3", 10 µW during time "4," and 2.4 W during time "5"). In one embodiment, the POE controller 203 may use the various real-time power consumption values from each cycle of the predetermined periods of time to characterize the real-time power consumption of SSD 205. Although individual read, write and erase commands may not consume a significant amount of power, an SSD with many channels may process numerous read, write, and/or erase commands simultaneously, resulting in significant power consumption at a particular moment in time. The characterized real-time power consumption of SSD 205 may be represented as an average power consumption, RMS (root mean square) power consumption, a statistical model identifying a distribution and standard deviation of power consumption, or any other known method of calculating or characterizing power consumption.

In another embodiment, POE controller 203 efficiently manages the power consumption of SSDs 205, 207, and 209 by monitoring the number and type of operations within the command queue of each of SSDs 205, 207, and 209. In one embodiment, the POE controller 203 may maintain an estimated power consumption table 203b identifying the estimated power consumption for each of SSDs 205, 207, and 209 via ports 201a, 201b, and 201c respectively. For example, if one of the commands in command queue 219 of SSD 105 is a command to write four pages of data to non-volatile memory 205d, POE controller 203 can estimate the expected power consumption of the write operation. For example, if a particular SSD consumes 10 µJ of energy for 400 µs to write a single page of data, POE controller 203 can extrapolate the power consumption for a single page of data to estimate that the SSD will consume 250 mW to write four pages of data. The POE controller 203 can perform the same calculation for all pending commands in the command queue for SSD 205 to calculate the estimated power consumption for various durations of time (where each duration may be the same as or different from the predetermined period of time used to monitor the real-time power consumption) and store the calculated values in table 203b. Similarly, the POE controller 203 may monitor the number and type of operations within buffers 241, 243, 245, and 247 of non-volatile memory 205d to calculate the estimated power consumption of commands 231, 233, 235, and 237 buffered on memory channels 221, 223, 225, and 227, and store the calculated values in table 203b. In one embodiment, the POE controller 203 may use the various estimated power consumption values to characterize the estimated power consumption of SSD 205. The characterized estimated power consumption of SSD 205 may be represented as an average power consumption, RMS (root mean square) power consumption, a statistical model identifying a distribution and standard deviation of power consumption, or any other known method of calculating or characterizing power consumption.

The POE controller 203 may use the predicated power consumption for each of SSDs 205, 207, and 209 to ensure the allocated power consumption is sufficient to satisfy the estimated power consumption. If the POE controller 203 determines that the allocated power consumption is not sufficient to satisfy the estimated power consumption for one or more of SSDs 205, 207, and/or 209, the POE controller 203 may instruct Ethernet switch 201 to reduce the allocated power to the SSDs that do not require the allocated power, and increase the power to the SSDs that require additional power to perform the pending commands in the command queues and/or memory buffers of the non-volatile memories of such SSDs.

In another embodiment, POE controller 203 efficiently manages the power consumption of SSDs 205, 207, and 209 by balancing the write commands directed to each of SSDs 205, 207, and/or 209 to achieve optimal power consumption across the SSDs. For example, if the host client 211 sends a write command 251 to POE controller 203 via Ethernet switch 201, the POE controller 203 may issue the write command 251 to the SSD that has the lowest power consumption and/or the lowest estimated power consumption. In one embodiment, the POE controller 203 determines which of SSDs 205, 207, or 209 should execute the write command by checking the write activity of such SSDs. For example, POE controller 203 may check the number of write commands pending in memory buffers 241, 243, 245, and 247 of SSD 205 and the number of write commands pending in command queue 219 of SSD 205. The POE controller 203 may perform the same check for SSDs 207 and 209. The POE controller 203 may calculate the number of pending write commands for each of SSDs 205, 207, and 209 to identify whether there is an imbalance in write activity between SSDs 205, 207, and/or 209. In one embodiment, if POE controller 203 detected an imbalance in write activity, the POE controller 203 may send the write command to the SSD with the lowest write activity. In another embodiment, the POE controller 203 may send the write command to the SSD with the lowest real-time power consumption, the lowest estimated power consumption, and/or the lowest characterized real-time and/or estimated power consumption.

In another embodiment, POE controller 203 may use any combination of the above techniques to efficiently manage the power consumption of SSDs 205, 207, and 209.

In one embodiment, POE controller 203 communicates directly with SSDs 205, 207, and 209 (not shown in FIG. 2) to efficiently manage the power supplied by Ethernet switch 201 to ports 201a, 201b, and 201c. In this embodiment, POE controller 203 may manage the SSDs 205, 207, and 209 using, for example, I²C connectivity and a protocol such as the NVMe-MI protocol to dynamically manage the power consumed by SSDs 203, 205, and 207. In another embodiment, any known connectivity standard and any known protocol may be used. In another embodiment, POE controller 203 may be incorporated within Ethernet Switch 201 (not shown in FIG. 2) and may communicate directly with SSDs 205, 207, and 209.

Figure 3:
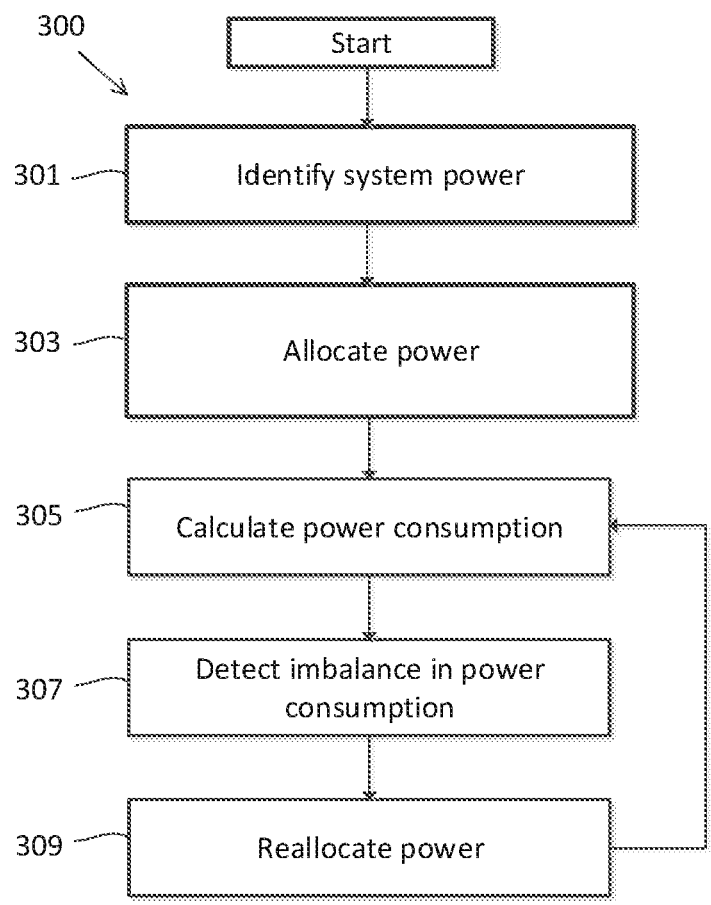
FIG. 3 is a flow chart of steps for one embodiment of efficiently managing power consumption of SSDs in a network.

FIG. 3 is a flow chart of steps 300 illustrating one embodiment of efficiently managing power consumption of SSDs in a network. As discussed with respect to FIGS. 1 and 2, a POE controller 103 and 203 monitors and manages commands (and associated data) from a host client 111 and 211 via Ethernet switch 101 and 201. In one embodiment, any number of host clients 111 and 211 may be connected to Ethernet switch 101 and 201 and POE controller 103 and 203 monitors and manages commands (and associated data) from each of host clients 111 and 211. Commands issued from host client 111 and 211 are sent to SSDs 105, 107, and 109, and 205, 207, and 209 via Ethernet switch 101 and 201. POE controller 103 and 203 can manage the capacity of power allocated to each of ports 101a, 101b, and 101c and 201a, 201b, and 201c based on the power consumption of each of the associated SSDs connected to such ports. Although the following description makes reference to elements of FIG. 2, the method steps are equally applicable to the elements of FIG. 1.

At step 301, POE controller 203 identifies the total power of the system by communicating with Ethernet switch 201. At step 303, POE controller 203 instructs Ethernet switch 201 to allocate a specified power to each of ports 201a, 201b, and 201c. In one embodiment, the allocated power to each of ports 201a, 201b, and 201c is an average of the total power of Ethernet switch 201. For example, if Ethernet switch 201 has a total capacity of 18W, the allocated power to each of ports 201a, 201b, and 201c is 6 W. In another embodiment, the allocated power may vary for each of ports 201a, 201b and 201c.

At step 305, POE controller 203 calculates the real-time power consumption of SSDs 205, 207, and 209. In one embodiment, POE controller calculates the real-time power consumption of SSDs 205, 207, and 209 by monitoring the real-time power consumption of each SSD during a predetermined period of time. In one embodiment, the POE controller 203 may maintain a real-time power consumption table 203a identifying the real-time power consumption for each of SSDs 205, 207, and 209 connected to ports 201a, 201b, and 201c respectively. The POE controller 203 may continuously monitor the real-time power consumption of each of SSDs 205, 207, and 209 over numerous cycles of the predetermined period of time and store the calculated power consumption of each SSD during each cycle in table 203a (e.g., time "1" corresponds to the first 500 ms cycle, time "2" corresponds to the second 500 ms cycle, etc.). In one embodiment, the POE controller 203 may use the various real-time power consumption values from each cycle of the predetermined periods of time to characterize the real-time power consumption of SSD 205. The characterized real-time power consumption of SSD 205 may be represented as an average power consumption, RMS (root mean square) power consumption, a statistical model identifying a distribution and standard deviation of power consumption, or any other known method of calculating or characterizing power consumption.

In another embodiment, POE controller calculates the power consumption of SSDs 205, 207, and 209 by calculating the estimated power consumption of each SSD. POE controller 203 monitors the number and type of operations within the command queue of each of SSDs 205, 207, and 209. In one embodiment, the POE controller 203 may maintain an estimated power consumption table 203b identifying the estimated power consumption for each of SSDs 205, 207, and 209 connected to ports 201a, 201b, and 201c respectively. For example, if one of the commands in command queue 219 of SSD 205 is a command to write four pages of data to non-volatile memory 205d, POE controller 203 can estimate the expected power consumption of the write operation. The POE controller 203 can perform the same calculation for all pending commands in the command queue for SSD 205 to calculate the estimated power consumption for various durations of time and store the calculated values in table 203b. Similarly, the POE controller 203 may monitor the number and type of operations within memory buffers 241, 243, 245, and 247 of non-volatile memory 205d to calculate the estimated power consumption of commands 231, 233, 235, and 237 buffered on memory channels 221, 223, 225, and 227, and store the calculated values in table 203b. In one embodiment, POE controller 203 may rely on memory buffers 241, 243, 245, and 247 and/or command queue 219 to calculate the estimated power consumption of SSD 205 and store the calculated values in table 203b. In one embodiment, POE controller 203 may construct a timeline of estimated power consumption stored in table 203b, where the more immediate estimated power consumption is based on the sequence of commands queued in memory buffers 241, 243, 245, and 247, followed by the estimated power consumption based on the commands in command queue 219. In one embodiment, the POE controller 203 may use the various estimated power consumption values to characterize the estimated power consumption of SSD 205. The characterized estimated power consumption of SSD 205 may be represented as an average power consumption, RMS (root mean square) power consumption, a statistical model identifying a distribution and standard deviation of power consumption, or any other known method of calculating or characterizing power consumption At step 307, POE controller 203 may use the real-time power consumption, estimated power consumption, and/or any characterization of real-time and/or estimated power consumption for each of SSDs 205, 207, and 209 to detect an imbalance in power consumption between such SSDs. The detected imbalance in power consumption may be an imbalance in the real-time power being consumed by SSDs 205, 207, and 209 and/or an imbalance in the estimated power that will be consumed by SSDs 205, 207, and 209 based upon the commands pending in memory buffers and/or the command queues of such SSDs.

At step 309, POE controller 203 may reallocate power to SSDs 205, 207, and 209 based upon the real-time power consumption, estimated power consumption, and/or any characterization of real-time and/or estimated power consumption of each of SSDs 205, 207, and 209 to ensure sufficient power is allocated to meet the required power consumption for such SSDs. For example if SSD 205 is allocated 6 W of power but has a real-time power consumption of 2 W and is estimated to consume 3 W within the next 20 seconds, the allocated power to SSD 205 over port 201a may be reduced to 3 W so that the additional 3 W of power may be allocated to an SSD that has a real-time power consumption and/or an estimated power consumption more than the allocated 6 W of power. The method steps then proceed from step 309 to step 305. The repetitive nature of method steps 300 ensures that POE controller 203 is continuously monitoring the real-time power consumption and/or estimated power consumption of SSDs 205, 207, and 209 to ensure that Ethernet switch 201 is allocating sufficient power to such SSDs over ports 201a, 201b, and 201c.

Figure 4:
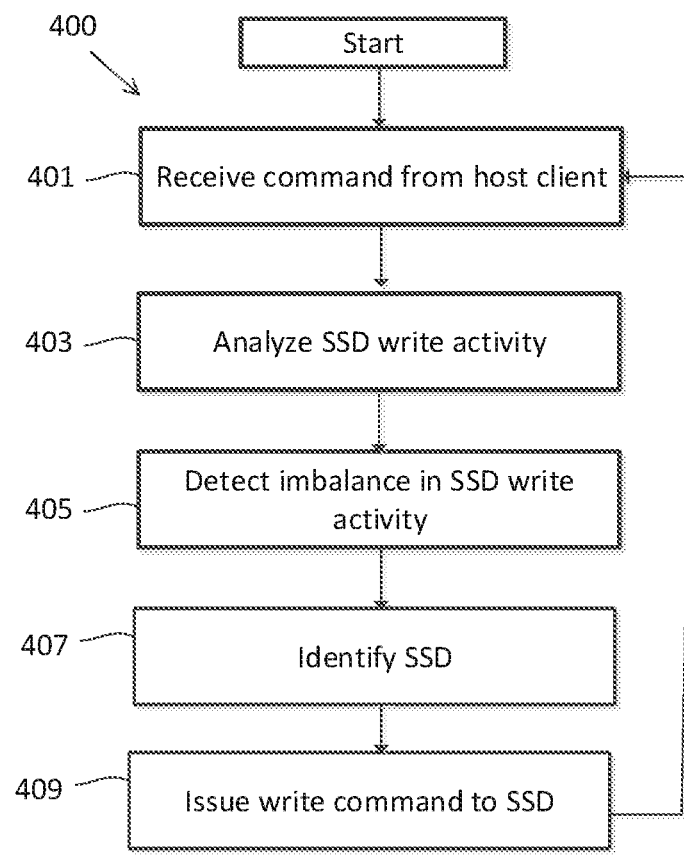
FIG. 4 is a flow chart of steps for one embodiment of efficiently managing power consumption of SSDs in a network.

FIG. 4 is a flow chart of steps 400 illustrating one embodiment of efficiently managing power consumption of SSDs in a network. As discussed with respect to FIGS. 1 and 2, a POE controller 103 and 203 monitors and manages commands (and associated data) from a host client 111 and 211 via Ethernet switch 101 and 201. In this embodiment, commands 251 from the host client 111 and 211 are sent to POE controller 103 and 203 via Ethernet switch 101 and 201. Commands issued from host client 111 and 211 are routed by the POE controller 102 and 203 to SSDs 105, 107, and 109, and 205, 207, and 209 via Ethernet switch 101 and 201. POE controller 103 and 203 can manage the power consumption of SSDs 105, 107, and 109 and 205, 207, and 209 by issuing write commands 251 received from the host client111 and 211 to the SSD that has the lowest power consumption. In one embodiment, any number of host clients 111 and 211 may be connected to Ethernet switch 101 and 201 and POE controller 103 and 203 monitors and manages commands (and associated data) from each of host clients 111 and 211. Although the following description makes reference to elements of FIG. 2, the method steps are equally applicable to the elements of FIG. 1.

At step 401, POE controller 203 receives commands 251 (including, for example, write commands) from the host client 211 via Ethernet switch 201.

At step 403, POE controller 203 analyzes the write activity of SSDs 205, 207, and 209. In one embodiment, the POE controller 203 analyzes the write activity of SSD 205 by checking the number of write commands pending in memory buffers 241, 243, 245, and 247 of SSD 205 and the number of write commands pending in command queue 219 of SSD 205. The POE controller 203 may perform the same check for SSDs 207 and 209. The POE controller 203 may calculate the number of pending write commands for each of SSDs 205, 207, and 209.

At step 405, POE controller 203 uses the calculated number of pending write commands for each of SSDs 205, 207, and 209 to identify whether there is an imbalance in write activity between SSDs 205, 207, and/or 209.

At step 407, the POE controller 203 identifies an SSD to which the POE controller 203 can issue the write command. In one embodiment, POE controller 203 issues the write command to the SSD with the lowest write activity. However, this may not be the most efficient approach because pending read and erase commands for such SSD may result in such SSD consuming significantly more power than other SSDs. In another embodiment, the POE controller 203 issues the write command to the SSD with the lowest real-time power consumption, the lowest estimated power consumption, and/or the lowest characterized real-time and/or estimated power consumption. At step 409, the POE controller 203 issues the write command to the SSD identified at step 407.

The method steps then proceed from step 407 to step 401. The repetitive nature of method steps 400 ensures that POE controller 203 is continuously monitoring write activity and/or the real-time power consumption and/or estimated power consumption of SSDs 205, 207, and 209 to ensure that write activity from the host client 211 is issued to such SSDs in a manner that efficiently manages power consumption of such SSDs.

In one embodiment, POE controller 203 may implement any combination of method steps 300 and method steps 400 to efficiently manage the power consumption of SSDs 205, 207, and 209 via ports 201a, 201b, and 201c of Ethernet Switch 201.

Other objects, advantages and embodiments of the various aspects of the present invention will be apparent to those who are skilled in the field of the invention and are within the scope of the description and the accompanying Figures. For example, but without limitation, structural or functional elements might be rearranged, or method steps reordered, consistent with the present invention. Similarly, principles according to the present invention could be applied to other examples, which, even if not specifically described here in detail, would nevertheless be within the scope of the present invention.

What is claimed is:

1. A network of solid state drives (SSDs) comprising:
a switch configured to be communicatively coupled to a controller and a host client, wherein the switch comprises a plurality of powered ports; and
a plurality of SSDs configured to be communicatively coupled to the plurality of powered ports,
wherein the switch is configured to deliver up to a predefined power level to each of the plurality of SSDs via the plurality of powered ports,
wherein each of the plurality of SSDs consumes power,
wherein the controller is configured to:
manage the predefined power level for each of the plurality of SSDs by identifying the power consumed by each of the plurality of SSDs and allocating a new power level to deliver to each of the plurality of SSDs based on the power consumed by each of the plurality of SSD,
allocate a power to be provided by each port, and
monitor each port to determine if the power consumption by an SSD attached to the port deviates from the allocated power to be provided by each port,
wherein a total power is shared between the plurality of SSDs using an average allocation for each of the plurality of SSDs, and the allocation is reduced by an amount for one of the plurality of SSDs, while the allocation is increased by that amount for at least another of the plurality of SSDs;
wherein the controller is also configured to manage the total power shared by the plurality of SSDs by either limiting the performance of write commands by the SSDs, or adjusting the frequency of issuing write commands to the SSDs, based on a set power budget of the plurality of ports with the corresponding plurality of SSDs; and
wherein the plurality of SSDs are directly coupled to the plurality of powered ports and the plurality of powered ports are Ethernet ports.

2. The SSD of claim 1, wherein the plurality of SSDs are communicatively coupled to the plurality of powered ports via an adapter.

3. The SSD of claim 1, wherein the power consumed by each of the plurality of SSDs is identified by calculating the power consumed by each of the plurality of SSDs during one or more predetermined time periods in real-time.

4. The SSD of claim 3, wherein a root-mean-square power consumption is calculated for each of the plurality of SSDs based on the power consumed during one or more predetermined time periods in real-time.

5. The SSD of claim 1, wherein the power consumed by each of the plurality of SSDs is identified by estimating the power consumed by each of the plurality of SSDs during one or more predetermined time periods according to a number of commands pending in one or more memory buffers of each of the plurality of SSDs.

6. The SSD of claim 1, further comprising a server rack space, wherein the switch and the plurality of SSDs are configured to occupy the server rack space.

7. A network of solid state drives (SSDs) comprising:
a switch comprised of a plurality of powered ports;
a plurality of SSDs configured to be communicatively coupled to the plurality of powered ports;
a server rack space, wherein the switch and the plurality of SSDs are configured to occupy the server rack space; and
a controller configured to be communicatively coupled to the switch, wherein the controller is configured to:
manage a maximum power level allocated to each of the plurality of SSDs by identifying a power consumed by each of the plurality of SSDs and adjusting the maximum power level to deliver to each of the plurality of SSDs based on the power consumed by each of the plurality of SSDs,
allocate a power to be provided by each port, and
monitor each port to determine if the power consumption by an SSD attached to the port deviates from the allocated power to be provided by each port,
wherein a total power is shared between the plurality of SSDs using an average allocation for each of the plurality of SSDs, and the allocation is reduced by an amount for one of the plurality of SSDs, while the allocation is increased by that amount for at least another of the plurality of SSDs;
wherein the controller is also configured to manage the total power shared by the plurality of SSDs by either limiting the performance of write commands by the SSDs, or adjusting the frequency of issuing write commands to the SSDs, based on a set power budget of the plurality of ports with the corresponding plurality of SSDs; and
wherein the plurality of SSDs are directly coupled to the plurality of powered ports and the plurality of powered ports are Ethernet ports.

8. A method of implementing a plurality of SSDs over a network, the method comprising:
identifying a total system power;
allocating a power level to each of a plurality of SSDs communicatively coupled to a plurality of powered ports of a switch, wherein the total of the allocated power levels does not exceed the total system power;
identifying a power consumed by each of the plurality of SSDs;
detecting an imbalance in the power consumed by each of the plurality of SSDs;
allocating a different power level to deliver to each of the plurality of SSDs based on the power consumed by each of the plurality of SSDs, wherein the total of the allocated different power level to each of the plurality of SSDs does not exceed the total system power;
allocating a power to be provided by each port;
monitoring each port to determine if the power consumption by an SSD attached to the port deviates from the allocated power to be provided by each port;
sharing a total power between the plurality of SSDs using an average allocation for each of the plurality of SSDs, wherein the allocation is reduced by an amount for one of the plurality of SSDs, while the allocation is increased by that amount for at least another of the plurality of SSDs;
managing the total power shared by the plurality of SSDs by either limiting the performance of write by the SSDs, or adjusting the frequency of issuing write commands to the SSDs, based on a set total power budget of the plurality of ports with the corresponding plurality of SSDs; and
wherein the plurality of SSDs are directly coupled to the plurality of powered ports and the plurality of powered ports are Ethernet ports.

9. The method of claim 8, wherein the power consumed by each of the plurality of SSDs is identified by calculating the power consumed by each of the plurality of SSDs during one or more predetermined time periods in real-time.

10. The method of claim 9, wherein a root-mean-square power consumption is calculated for each of the plurality of SSDs.

11. The method of claim 8, wherein the power consumed by each of the plurality of SSDs is identified by estimating the power consumed by each of the plurality of SSDs during one or more predetermined time periods according to a number of commands pending in one or more memory buffers of each of the plurality of SSDs.

12. The SSD of claim 1, wherein the controller uses a connectivity standard and a protocol to manage the predefined power level for each of the plurality of SSDs.

* * * * *